(12) United States Patent
Takata

(10) Patent No.: US 8,457,527 B2
(45) Date of Patent: Jun. 4, 2013

(54) ORIGINAL READING DEVICE AND IMAGE FORMING APPARATUS INCLUDING THE SAME

(75) Inventor: Sohichi Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 319 days.

(21) Appl. No.: 13/004,151

(22) Filed: Jan. 11, 2011

(65) Prior Publication Data

US 2011/0176124 A1    Jul. 21, 2011

(30) Foreign Application Priority Data

Jan. 19, 2010  (JP) ................................ 2010-009021

(51) Int. Cl.
*G03G 21/00* (2006.01)

(52) U.S. Cl.
USPC .............. 399/124; 399/125; 399/380; 16/286

(58) Field of Classification Search
USPC ................. 399/107, 110, 124, 125, 361, 365, 399/367, 379, 380; 16/239, 286
See application file for complete search history.

(56) References Cited

U.S. PATENT DOCUMENTS

| 7,440,712 | B2 * | 10/2008 | Uchida | 399/107 |
| 7,617,568 | B2 | 11/2009 | Jing | |
| 8,139,994 | B2 * | 3/2012 | Suzuki | 399/380 |
| 2005/0031390 | A1 * | 2/2005 | Orozco-Abundis | 399/380 |
| 2005/0042006 | A1 * | 2/2005 | Qian et al. | 399/380 |
| 2010/0040398 | A1 * | 2/2010 | Shin | 399/367 |

FOREIGN PATENT DOCUMENTS

| JP | 07-197929 | 8/1995 |
| JP | 09-179218 | 7/1997 |
| JP | 09-261392 | 10/1997 |
| JP | 2003-302715 | 10/2003 |
| JP | 2005-338479 | 12/2005 |
| JP | 2007-86756 | 4/2007 |

* cited by examiner

*Primary Examiner* — Hoan Tran
(74) *Attorney, Agent, or Firm* — Renner, Otto, Boisselle & Sklar, LLP

(57) ABSTRACT

An original reading device is provided with an original cover, an original reading device main body, and a cover attachment portion that attaches the original cover to the original reading device main body in an openable and closeable manner, and the cover attachment portion is constituted by a rod-shaped hinge portion that is attached to the original cover through an open-close mechanism portion, and a hinge guide portion that is provided in the original reading device main body and through which the rod-shaped hinge portion is inserted and supported, and a latch indentation is provided in the hinge guide portion such that a latch protrusion provided at a lower portion of the rod-shaped hinge portion is latched into the latch indentation to maintain a state in which the rod-shaped hinge portion is pulled out a predetermined distance from the hinge guide portion.

15 Claims, 9 Drawing Sheets

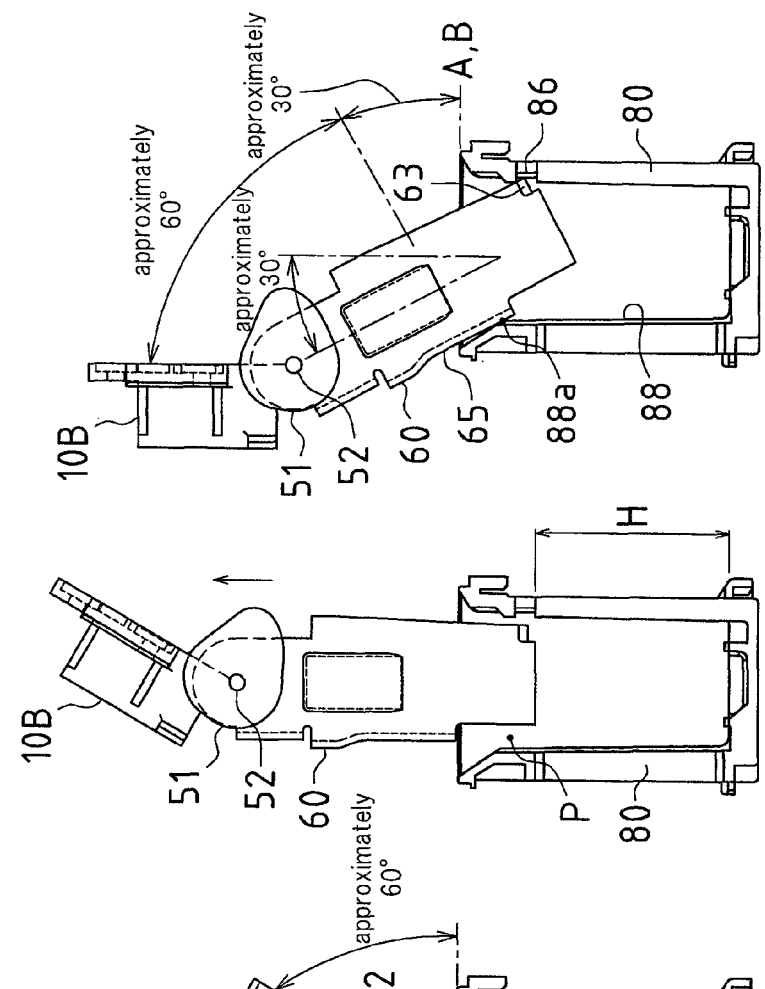

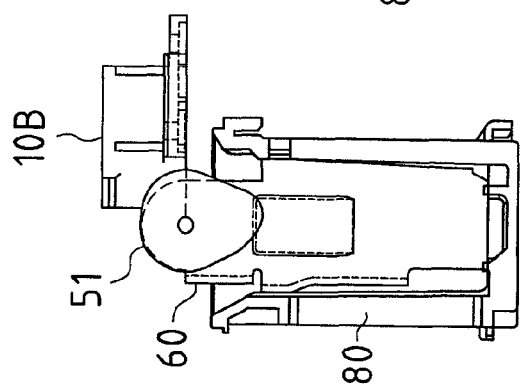
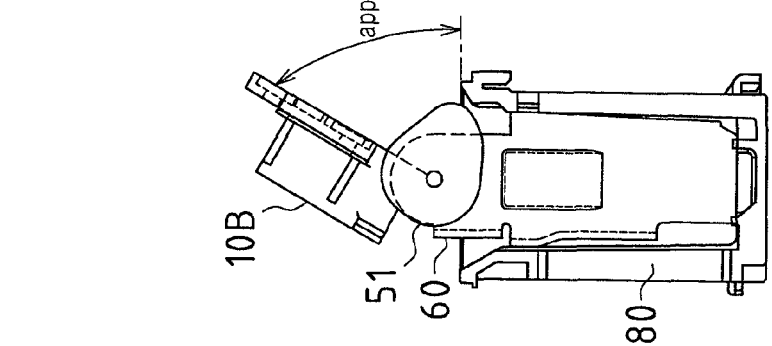
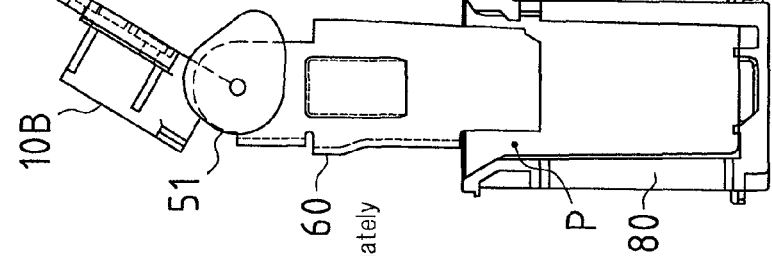
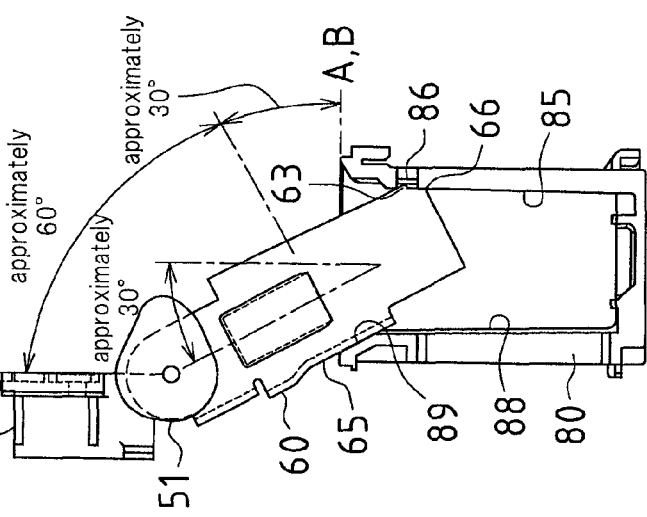

ORIGINAL READING DEVICE AND IMAGE FORMING APPARATUS INCLUDING THE SAME

CROSS-REFERENCE TO RELATED APPLICATIONS

This application claims priority under 35 U.S.C. §119(a) on Patent Application No. 2010-009021 filed in Japan on Jan. 19, 2010, the entire contents of which are herein incorporated by reference.

BACKGROUND OF THE INVENTION

1. Field of the Invention

The present invention relates to an original reading device that is provided with an original cover, which is provided with an original transport device; an original reading device main body, which is provided with an original placement platform; and a cover attachment portion for attaching the original cover to the original reading device main body in an openable and closeable manner, and more specifically relates to original reading devices and image forming apparatuses including the same in which adjustment of an opening angle of the original cover is enabled by devising a hinge structure of the cover attachment portion.

2. Description of the Related Art

Conventional original reading devices employ a hinge structure as the cover attachment portion for attaching the original cover to the original reading device main body in an openable and closeable manner. A structure that enables the original cover to open from zero to almost 90 degrees with respect to the reading surface of the original placement platform of the original reading device main body is widely employed as the conventional hinge structure (see JP 2007-86756A for example).

However, in the case of a configuration in which the original cover is provided with the original transport device, there is a problem that when the original cover is opened 90 degrees while originals are placed on the original transport device, the originals placed on the original transport device slip down undesirably to a rear side (back side) of the original reading device due to the tilt of the original cover. Furthermore, even in a case where a thick original such as a book are placed on the original placement platform, there is almost no usage situation as an actual situation in ordinary usage conditions that necessitates the original cover being opened to 90 degrees.

For this reason, conventional original reading devices that are provided with an original cover having an original transport device are commonly configured so that when the original cover is opened while originals are placed on the original transport device, it can only open to an angle at which originals do not drop, for example, approximately 60 degrees.

However, in original reading devices in which the original cover opens only to 60 degrees, for example in a case where the original reading portion (scanner portion) has suffered a malfunction (for example, a case where dust has adhered to the back surface of the glass of the original placement platform and the shape of this dust is being copied undesirably, or a case where a component breakdown has occurred in the original scanning portion in which a lamp, mirrors, and reading elements and the like are mounted for reading the originals), even if an attempt is made to remove the glass of the original placement platform to perform work on internal portions of the scanner portion, a driver for removing the screws or the like by which the glass is installed will not be able to reach desired positions by only an operation of opening the original cover based on the hinge structure portion, and ultimately it will be necessary to carry out repair work and the like by removing the entire original reading device from the image forming apparatus main body, which is a problem in that the work involved becomes more extensive.

Furthermore, in a case where the original reading device is to be taken out, it is necessary to remove wires and the like connected between the device and the image forming apparatus, which is a problem in that more time and effort is required in the work.

SUMMARY OF THE INVENTION

The present invention has been devised to solve these problems, and it is an object thereof to provide an original reading device and image forming apparatus including the same that are configured so that during ordinary usage, the original cover opens only to an angle smaller than 90 degrees (for example, approximately 60 degrees) so that even when the original cover is opened in a state in which originals are placed on the original transport device, the placed originals do not drop unexpectedly, and on the other hand, the original cover opens easily to an angle (for example, approximately 90 degrees) larger than the maximum angle during ordinary usage at times when maintenance is performed including repairs or the like in a case where a malfunction has occurred in the original reading portion, thereby achieving improvements in workability during maintenance while maintaining operability during ordinary usage.

In order to address these issues, an original reading device according to the present invention is provided with an original cover that is provided with an original transport device; an original reading device main body that is provided with an original placement platform; and a cover attachment portion that attaches the original cover to the original reading device main body in an openable and closeable manner, wherein the cover attachment portion is provided with a rod-shaped hinge portion that is attached to the original cover through an open-close mechanism portion; and a hinge guide portion that is provided in the original reading device main body and through which the rod-shaped hinge portion is inserted and supported, and a latch indentation is provided in the hinge guide portion such that a latch protrusion provided at a lower portion of the rod-shaped hinge portion is latched into the latch indentation in a state in which the rod-shaped hinge portion is pulled out a predetermined distance from the hinge guide portion.

According to the present invention having these aspects, factors for determining the extent of opening of the original cover can be divided into two operations of an opening/closing operation of a conventionally equivalent open-close mechanism portion, and a leaning operation of the rod-shaped hinge portion by pulling out the rod-shaped hinge portion (that is, a latching/unlatching operation of the latch protrusion of the rod-shaped hinge portion and the latch indentation of the hinge guide portion). Accordingly, it is possible that during ordinary usage, the original cover is set to the ordinary opening/closing operation using the open-close mechanism portion such that the original cover opens only to an angle smaller than 90 degrees (for example, approximately 60 degrees), so that even when the original cover is opened in a state in which originals are placed on the original transport device, the placed originals do not drop unexpectedly. In a case where the operator desires to further open the original cover to perform maintenance or the like, the original cover can be further opened up to the larger angle (for example, approximately 90 degrees) than the maximum angle during ordinary usage by the leaning operation of the rod-shaped hinge portion by the pulling out of the rod-shaped hinge portion, thereby enabling the workability during maintenance or the like to be improved in the vicinity of the cover attachment portion.

Furthermore, in the original reading device according to the present invention, the open-close mechanism portion may be arranged to enable the original cover to open in one direction up to a first angle from a direction orthogonal to a longitudinal direction of the rod-shaped hinge portion, and in a state in which the latch protrusion is latched into the latch indentation, the rod-shaped hinge portion is held tilted in the one direction up to a second angle from a guide direction of the hinge guide portion.

In a state in which the original cover is opened up to the first angle from the direction orthogonal to the longitudinal direction of the rod-shaped hinge portion (that is, from the original placement surface of the original placement platform of the original reading device main body), when the rod-shaped hinge portion is pulled out by the predetermined distance and the latch protrusion is latched into the latch indentation, the original cover opens further from the first angle from the original placement surface of the original placement platform up to an angle (from the original placement surface of the original placement platform) that is larger than the first angle by the second angle. For this reason, the space in the vicinity of the cover attachment portion is enlarged and operability can be improved in the vicinity of the cover attachment portion.

Furthermore, in the original reading device according to the present invention, the open-close mechanism portion may be arranged to enable the original cover to rotate in a rotation direction up to the first angle centered on a rotating shaft, and the rod-shaped hinge portion is held in the hinge guide portion so as to enable the rod-shaped hinge portion to move the predetermined distance in a direction away from an extension surface of the original placement surface of the original placement platform, and further still to tilt in the rotation direction up to the second angle such that the latch protrusion is latched into the latch indentation.

With this configuration, an opening operation of the original cover can be achieved by two operations, these being a rotation operation in which the original cover is rotated in the rotation direction up to the first angle, and a leaning operation in which the rod-shaped hinge portion is moved by the predetermined distance in a direction away from the extension surface of the original placement surface of the original placement platform and is further tilted up to the second angle in the rotation direction. In this way, it is possible that during ordinary usage, the original cover is set to open only to an angle smaller than 90 degrees (for example, approximately 60 degrees) due to the rotation operation, so that even when the original cover is opened in a state in which originals are placed on the original transport device, the placed originals do not drop unexpectedly. On the other hand, in a case where the operator desires to further open the original cover to perform maintenance or the like, the original cover can be further opened up to the larger angle (for example, approximately 90 degrees) than the maximum angle during ordinary usage by the leaning operation, thereby enabling the workability during maintenance or the like to be improved in the vicinity of the cover attachment portion.

Furthermore, in the original reading device according to the present invention, the first angle may be set to approximately 60 degrees and the second angle may be set to approximately 30 degrees. Accordingly, in a case where the original cover is opened up to the first angle in a state in which originals for reading are placed on the original transport device, the original cover opens only up to an angle of 60 degrees from the original placement surface (horizontal surface) of the original placement platform, and therefore there is no concern that the originals placed on the original transport device will slip down to the rear side (back side) of the original reading device due to the tilt of the original cover. On the other hand, in a state in which the original cover is opened up to the approximately 60 degrees, which is the first angle, when the rod-shaped hinge portion is pulled out by the predetermined distance so that the latch protrusion is latched into the latch indentation, the original cover can be further opened up to an angle larger than the first angle by 30 degrees, which is the second angle, from approximately 60 degrees, which is the first angle, from the original placement surface (horizontal surface) of the original placement platform (that is, up to approximately 90 degrees from the original placement surface of the original placement platform). In this way, the space in the vicinity of the cover attachment portion is enlarged, and therefore operability can be improved in the vicinity of the cover attachment portion.

Furthermore, in the original reading device according to the present invention, it is possible that when a direction in which the original cover opens is a front-back direction as viewed by an operator facing a side surface on a far side from the hinge guide portion in the original reading device main body, the cover attachment portion is arranged in a rear portion of the original reading device main body, the rod-shaped hinge portion is formed in a rod shape, the hinge guide portion is formed as an open tube, and an upper portion of a rear side inner wall surface of the hinge guide portion is formed as a first tilted surface that is tilted backward from a direction vertical to an original reading surface of the original placement platform by the second angle.

With this configuration, when the rod-shaped hinge portion is tilted backward up to the second angle from the hinge guide portion in a state in which the rod-shaped hinge portion is pulled upward from the hinge guide portion by the predetermined distance, the latch protrusion of the rod-shaped hinge portion is latched into the latch indentation of the hinge guide portion, and the rear side outer wall surface of the rod-shaped hinge portion makes surface contact with the first tilted surface of the hinge guide portion and is held by the first tilted surface of the hinge guide portion. That is, the rod-shaped hinge portion makes surface contact with the first tilted surface of the hinge guide portion and is held by the hinge guide portion, thereby enabling the rod-shaped hinge portion to be held stably in a state in which the rod-shaped hinge portion is tilted by the second angle. Accordingly, even in a case where the original cover in a state opened up to the first angle is tilted further backward up to the second angle by pulling out the rod-shaped hinge portion by the predetermined distance, the original cover can be stably held in that state.

In one embodiment according to the present invention, the rod-shaped hinge portion is formed as a rod shape having a substantially rectangular-parallelepiped form, and the hinge guide portion is formed as an open tube having a substantially rectangular-parallelepiped form. However, the rod-shaped hinge portion and the hinge guide portion may be formed other than a substantially rectangular-parallelepiped form, and for example may be a substantially columnar form or a substantially hexagonal columnar form.

Furthermore, in the original reading device according to the present invention, it is possible that the rod-shaped hinge portion has the latch protrusion formed at a lower portion of a front side outer wall surface, and a lower part below the latch protrusion of the front side outer wall surface is formed as a second tilted surface that is tilted backward by the second angle from an upper part above the latch protrusion of the front side outer wall surface.

With this configuration, when the rod-shaped hinge portion is tilted backward up to the second angle from the hinge guide portion in a state in which the rod-shaped hinge portion is pulled upward from the hinge guide portion by the predetermined distance, the latch protrusion of the rod-shaped hinge portion is latched into the latch indentation of the hinge guide portion, and the rear side outer wall surface of the rod-shaped hinge portion makes surface contact with the first tilted surface of the hinge guide portion and is held by the first tilted surface of the hinge guide portion, and the second tilted surface of the rod-shaped hinge portion makes surface contact with the front side inner wall surface of the hinge guide portion and is held by the front side inner wall surface of the hinge guide portion. That is, the rod-shaped hinge portion can make surface contact with opposing inner wall surfaces of the hinge guide portion and be held by opposing inner wall surfaces of the hinge guide portion at two locations, these being the upper portion of the rear side outer wall surface and the lower portion of the front side outer wall surface, and therefore the rod-shaped hinge portion can be held more stably in a state in which the rod-shaped hinge portion is tilted by the second angle. Accordingly, even in a case where the original cover in a state opened up to the first angle is opened up to an angle that is greater than the first angle by the second angle by the rod-shaped hinge portion being pulled out by the predetermined distance to tilt the original cover further backward up to the second angle, the original cover can be more stably held in that state.

Furthermore, in the original reading device according to the present invention, the rod-shaped hinge portion may be formed so that a front-back direction dimension of a lower portion is smaller than a front-back direction dimension of an upper portion. That is, the transverse cross-section shape of the inner wall surface of the hinge guide portion and the transverse cross-section shape of the outer wall surface of the upper portion of the rod-shaped hinge portion are formed substantially equivalently so that the hinge guide portion and the upper portion of the rod-shaped hinge portion couple closely, and the transverse cross-section shape of the outer surface wall of the lower portion of the rod-shaped hinge portion (particularly the front-back direction dimension) is formed smaller than the transverse cross-section shape of the inner wall surface of the hinge guide portion (particularly the front-back direction dimension) so that a gap can be formed between the hinge guide portion and the lower portion of the rod-shaped hinge portion. In this way, when opening or closing the original cover to the first angle, the rod-shaped hinge portion is in a state closely coupled with the hinge guide portion, and therefore the original cover can be positioned with a predetermined positional accuracy when opening or closing the original cover. On the other hand, in a case where the operator desires to open the original cover up to angle greater than the first angle (for example, approximately 90 degrees), the rod-shaped hinge portion is pulled from the hinge guide portion by the predetermined distance. In this way, the upper portion of the rod-shaped hinge portion comes out from the hinge guide portion, and only the lower portion of the rod-shaped hinge portion is inserted inside the hinge guide portion. At this time, as described earlier, the front-back direction dimension of the lower portion of the rod-shaped hinge portion is formed smaller than the front-back direction dimension of the opening of the hinge guide portion, and the gap necessary for the rod-shaped hinge portion to tilt backward by the second angle is formed between the hinge guide portion and the rod-shaped hinge portion. Accordingly, in this state, the rod-shaped hinge portion is tilted (that is, the original cover is tilted) backward, and the latch protrusion of the rod-shaped hinge portion is latched into the latch indentation of the hinge guide portion, thereby enabling the original cover to open up to a larger angle (for example, approximately 90 degrees) than the first angle.

Furthermore, an image forming apparatus according to the present invention is provided with an original reading device according to the foregoing configurations and an image forming portion. According to the present invention, the extent of opening of the original cover can be adjusted by two operations of an opening/closing operation using a conventionally equivalent open-close mechanism portion, and a leaning operation of the rod-shaped hinge portion by pulling out the rod-shaped hinge portion (that is, a latching/unlatching operation of the latch protrusion of the rod-shaped hinge portion and the latch indentation of the hinge guide portion). Accordingly, it is possible that during ordinary usage, the original cover is set to the ordinary opening/closing operation using the open-close mechanism portion such that the original cover opens only to an angle smaller than 90 degrees (for example, approximately 60 degrees), so that even when the original cover is opened in a state in which originals are placed on the original transport device, the placed originals do not drop unexpectedly. An image forming apparatus can be provided in which, in a case where the operator desires to further open the original cover to perform maintenance or the like, the original cover can be further opened up to the larger angle (for example, approximately 90 degrees) than the maximum angle during ordinary usage by the leaning operation of the rod-shaped hinge portion by the pulling out of the rod-shaped hinge portion, thereby enabling the workability during maintenance or the like to be improved in the vicinity of the cover attachment portion.

BRIEF DESCRIPTION OF THE DRAWINGS

FIG. 6A to FIG. 6D are operational transition drawings of the cover attachment portion accompanying an opening/closing operation of the original cover.

FIG. 8A to FIG. 8D are operational transition drawings of the cover attachment portion accompanying an opening/closing operation of the original cover.

DETAILED DESCRIPTION OF THE INVENTION

Hereinafter, embodiments of the present invention are described with reference to the accompanying drawings. It should be noted that the following embodiments are single specific examples of the present invention and are not of a nature that limits the scope of the present invention.

Figure 1:
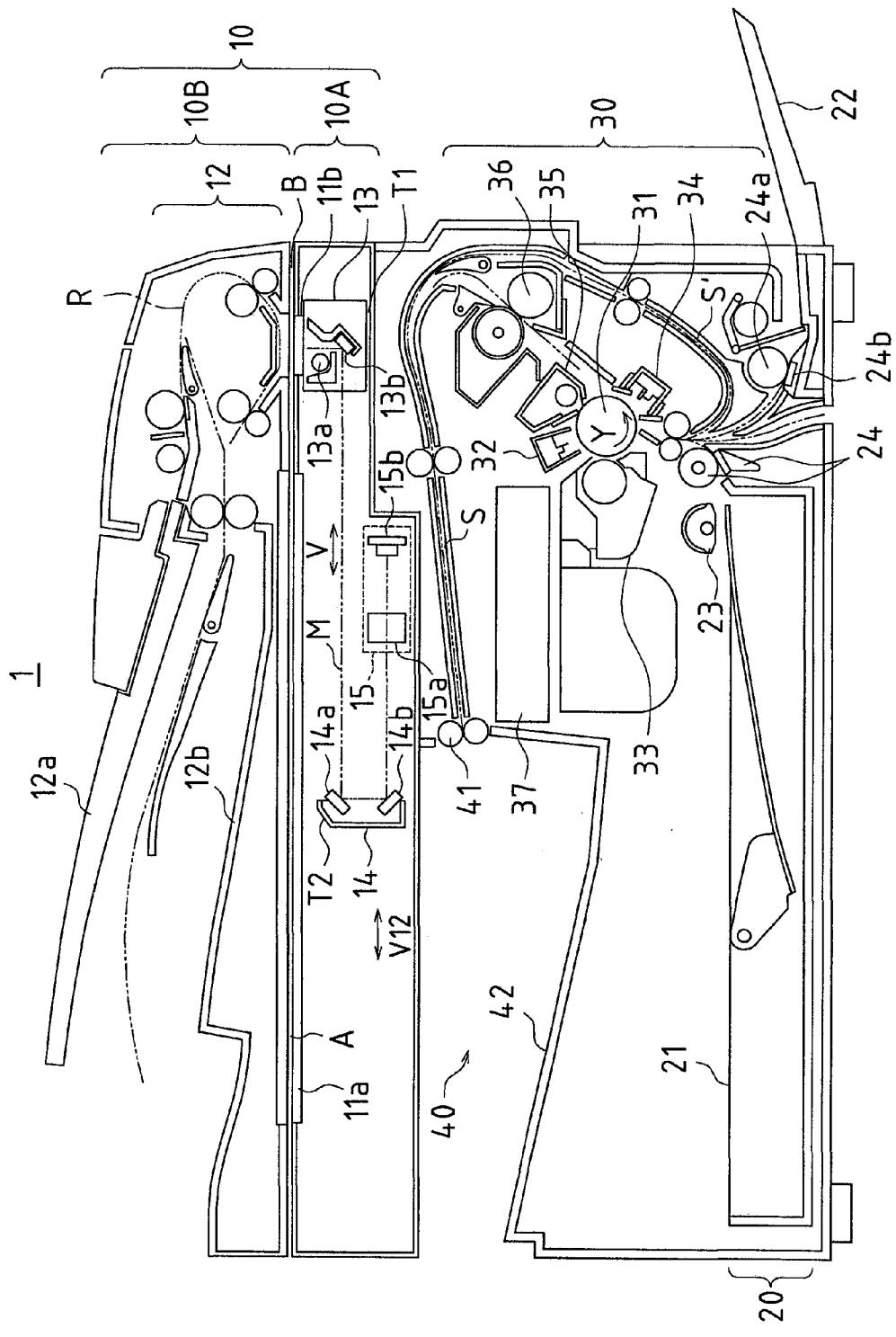
FIG. 1 is a schematic cross-sectional view as viewed from the front showing a schematic configuration of an image forming apparatus in which is mounted an original reading device according to an embodiment of the present invention.

FIG. 1 is a schematic cross-sectional view as viewed from the front showing a schematic configuration of an image forming apparatus in which is mounted an original reading device according to an embodiment of the present invention. First, description is given with reference to FIG. 1 regarding an overall configuration of the image forming apparatus.

An image forming apparatus 1 has a copier mode, a printer mode, and a fax mode as image-forming modes by which an image is formed on a paper (including recording media such as OHP sheets), with these modes being selected by a user, and double sided printing is also possible.

The image forming apparatus 1 is constituted by components such as an original reading portion 10, which is an original reading device according to an embodiment of the present invention, a paper feeding portion 20, an image forming portion 30, a paper discharge portion 40, and an operation panel portion that is not shown in the drawing.

The original reading portion 10 is arranged at an upper portion of the main body of the image forming apparatus 1 (hereinafter simply referred to as "apparatus main body"), and is constituted by an original reading device main body 10A, and an original cover 10B, which is arranged on the original reading device main body 10A. The original cover 10B is provided with an original transport device 12. The original reading device main body 10A accommodates components such as platen glasses (corresponding to original placement platforms in the present invention) 11a and 11b, a first scanning structure 13, a second scanning structure 14, and a reading optical portion 15. The original reading portion 10 reads image information of originals on original reading surfaces A and B of the platen glasses 11a and 11b.

The platen glasses 11a and 11b are made of transparent glass and are arranged at a top portion of the original reading device main body 10A so as to face the original transport device 12. The original transport device 12 performs automatic feeding over the platen glass 11b for originals that have been placed on an original placement tray 12a. In a case where a plurality of originals are placed on the original placement tray 12a, the original transport device 12 feeds the originals one by one over the platen glass 11b.

The first scanning structure 13 is constituted by components such as an exposure lamp 13a and a first reflective mirror 13b. The exposure lamp 13a exposes the original that has been placed on the original reading surface A of the platen glass 11a or the original that is fed over the original reading surface B of the platen glass 11b by the original transport device 12. The first reflective mirror 13b causes image light reflected by the original to be incident on a second reflective mirror 14a, which is described later.

The second scanning structure 14 is constituted by components such as the second reflective mirror 14a and a third reflective mirror 14b. The second reflective mirror 14a reflects the image light that is incident from the first reflective mirror 13b and causes this image light to be incident on the third reflective mirror 14b. The third reflective mirror 14b reflects the image light that is incident from the second reflective mirror 14a and causes this image light to be incident on an imaging lens 15a, which is configured in the reading optical portion 15. The reading optical portion 15 is constituted by components such as the imaging lens 15a and a CCD (charge coupled device) 15b, and reads the image light from the original. The imaging lens 15a images the image light that is incident from the third reflective mirror 14b onto the CCD 15b. The CCD 15b performs photoelectric conversion on the received image light.

Furthermore, when reading the image information of the original placed on the original reading surface A of the platen glass 11a, the first scanning structure 13 moves at a predetermined movement velocity V along a surface direction (horizontal direction) of the platen glasses 11a and 11b due to an unshown drive means, and the exposure lamp 13a exposes the original surface. At this time, the second scanning structure 14 moves at a movement velocity V/2 along the surface direction of the platen glasses 11a and 11b linked with movement of the first scanning structure 13 and causes the image light that is incident from the first scanning structure 13 to be incident on the imaging lens 15a. The movement velocity of the second scanning structure 14 is set to V/2 with respect to the movement velocity V of the first scanning structure 13 so as to keep a constant optical path length of an optical path M from the original surface to the CCD 15b and to receive image light accurately.

On the other hand, when reading an original that is placed on the original placement tray 12a of the original transport device 12, the first scanning structure 13 exposes the original surface of the original that is fed over the original reading surface B of the platen glass 11b facing the first scanning structure 13 via an original transport path R while staying stationary at a predetermined reading position T1 shown in FIG. 1. The exposed original is placed on a discharge tray 12b. At this time, the image light from the first scanning structure 13 is caused to be incident on the imaging lens 15a while the second scanning structure 14 is also similarly stationary at a reading position T2.

The paper feeding portion 20 is arranged at a lower portion of the apparatus main body and is constituted by components such as a paper feed tray 21, a manual feeding tray 22, a paper feeding roller 23, and a separating member 24. Papers to be fed to a paper transport path S during image forming are placed in the paper feed tray 21 and the manual feeding tray 22. The paper feeding roller 23 rotates to transport the papers accommodated in the paper feed tray 21 or the like to the separating member 24. Paper feeding portions 24a and 24b transport the papers placed on the manual feeding tray 22 to the separating member 24. When papers transported by the paper feeding roller 23 or the paper feeding portions 24a and 24b are transported overlaying each other in multiple sheets, the separating member 24 transports these sheet by sheet to the paper transport path S.

The image forming portion 30 is arranged below the original reading portion 10 on the manual feeding tray 22 side and is provided with a laser scanning unit (hereinafter referred to as LSU) 37, a photosensitive body 31, which is an image carrier, and a fixing device 36. The image forming portion 30 is configured having a charging device 32, a development device 33, a transfer device 34, and a cleaning unit 35 arranged in this order around the photosensitive body 31 in an arrow Y direction, which is the rotation direction of the photosensitive body 31.

The paper discharge portion 40 is arranged above the paper feed tray 21 and is constituted by components such as discharge rollers 41 and a discharge tray 42. The discharge rollers 41 discharge papers that have been transported on the paper transport path S to the discharge tray 42. Further still, the discharge rollers 41 are capable of reverse rotation, and when image forming is to be carried out on both sides of a paper, the paper that has been transported on the paper transport path S and on which image forming has been completed on the front surface is chucked, after which the discharge rollers 41 rotate in the reverse direction to the rotation direction for discharging the paper, thereby transporting the paper to a paper transport path S'. The discharge tray 42 accommodates papers that have been discharged by the discharge rollers 41 and on which image forming is completed.

The foregoing describes an outline configuration of the image forming apparatus 1.

In this configuration, the original cover 10B is attached through a cover attachment portion so as to be openable and closeable with respect to the original reading device main body 10A.

Hereinafter, specific description is given in regard to the cover attachment portion.

SPECIFIC EXAMPLE 1

Figure 2:
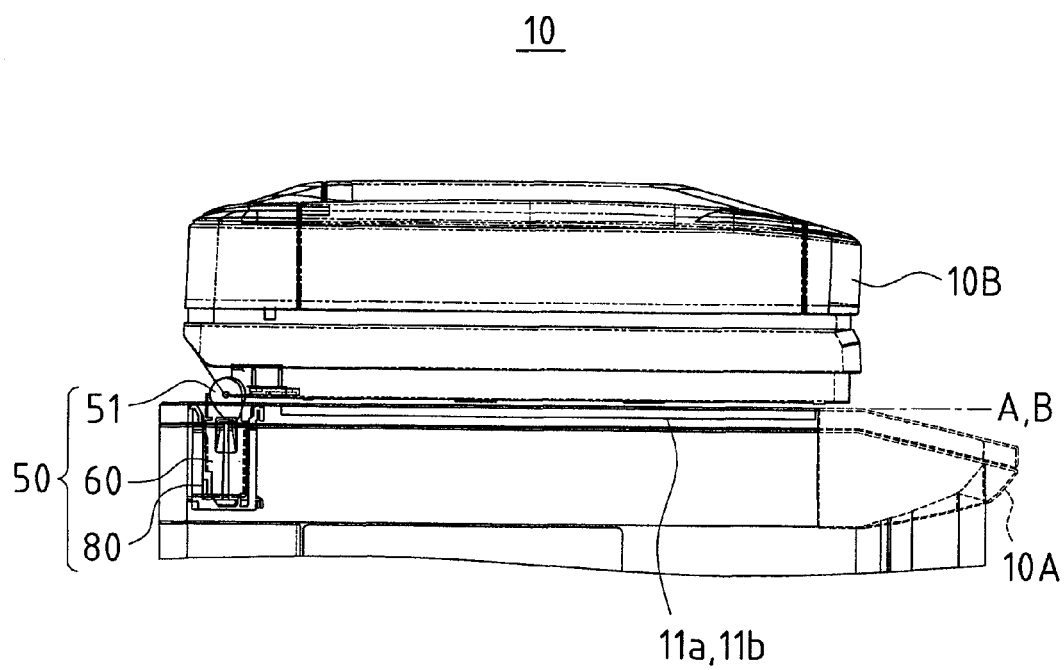
FIG. 2 is a lateral view of an original reading portion and shows only portions of a cover attachment portion according to a specific example 1 as a cross-sectional view.
Figure 3:
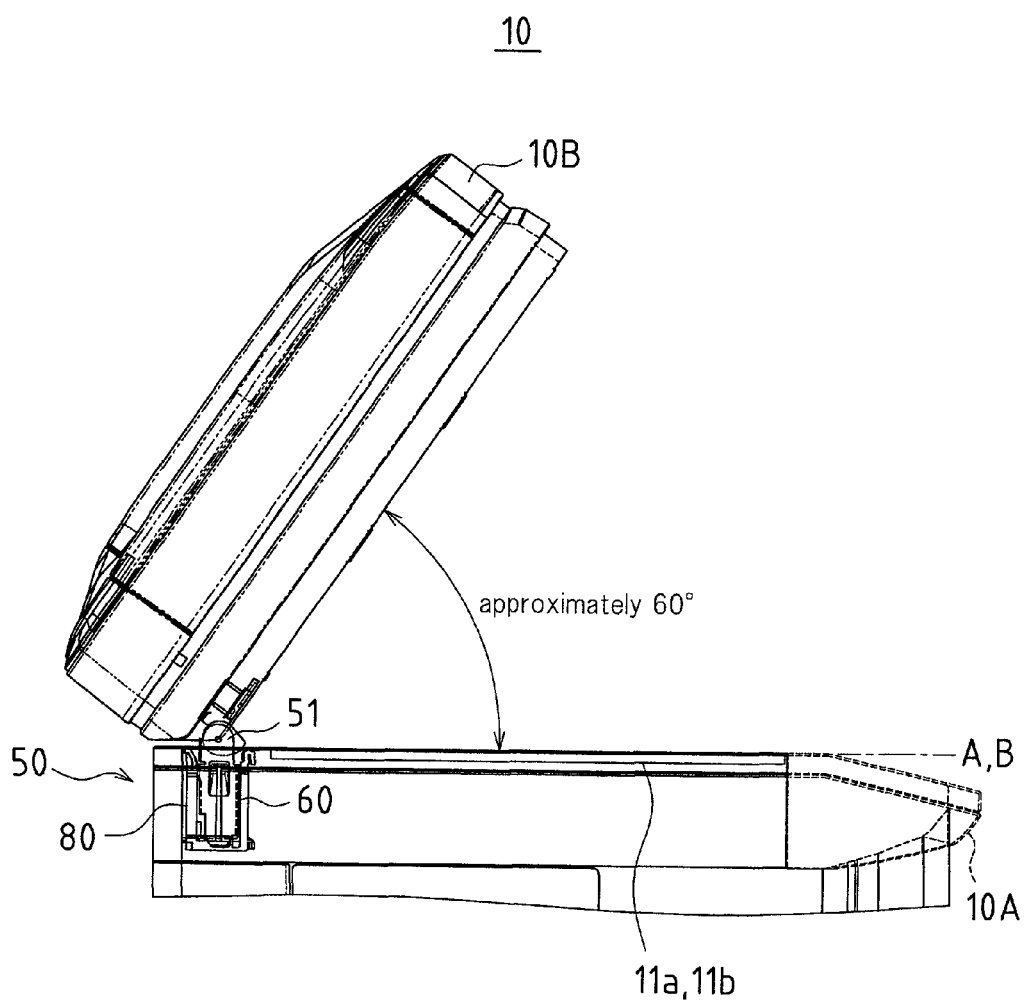
FIG. 3 is a lateral view of the original reading portion and shows only portions of the cover attachment portion according to the specific example 1 as a cross-sectional view.
Figure 4:
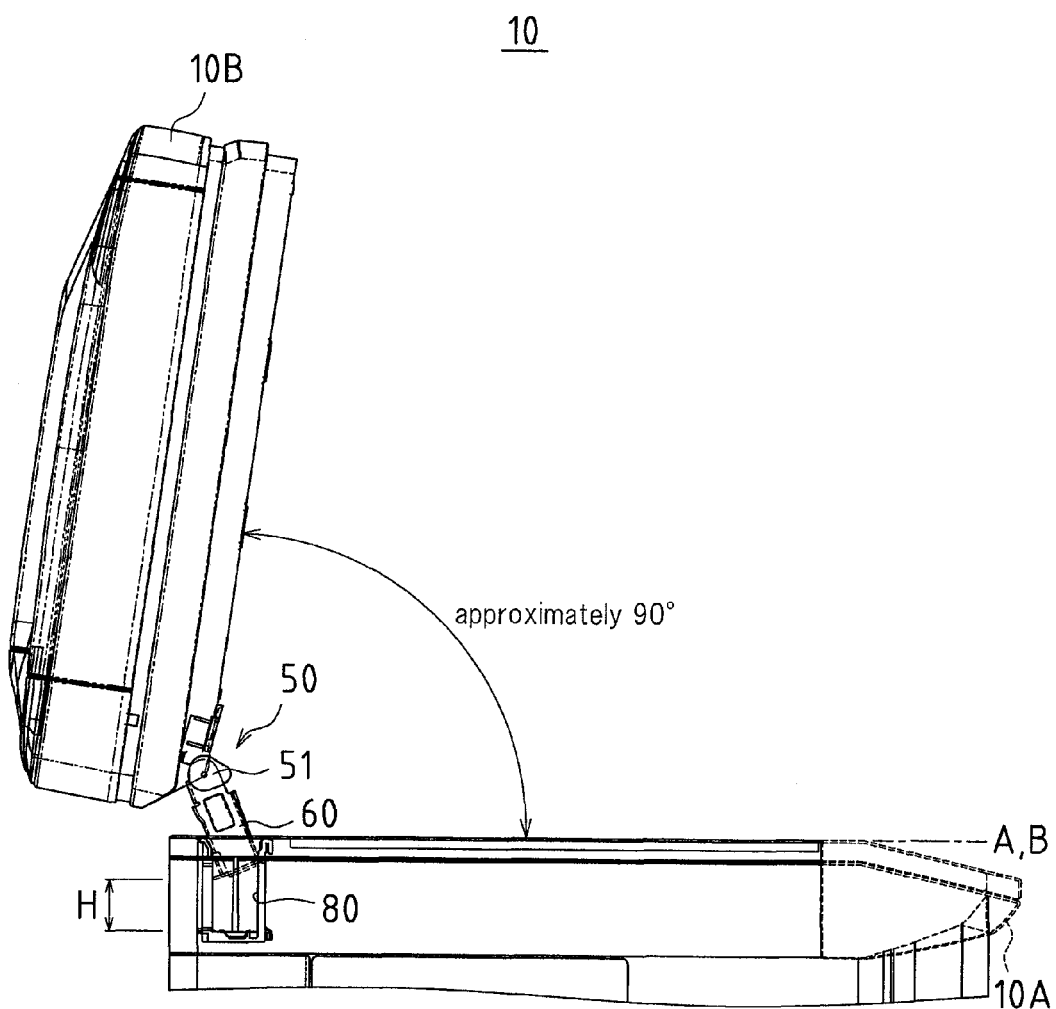
FIG. 4 is a lateral view of the original reading portion and shows only portions of the cover attachment portion according to the specific example 1 as a cross-sectional view.
Figure 5A:
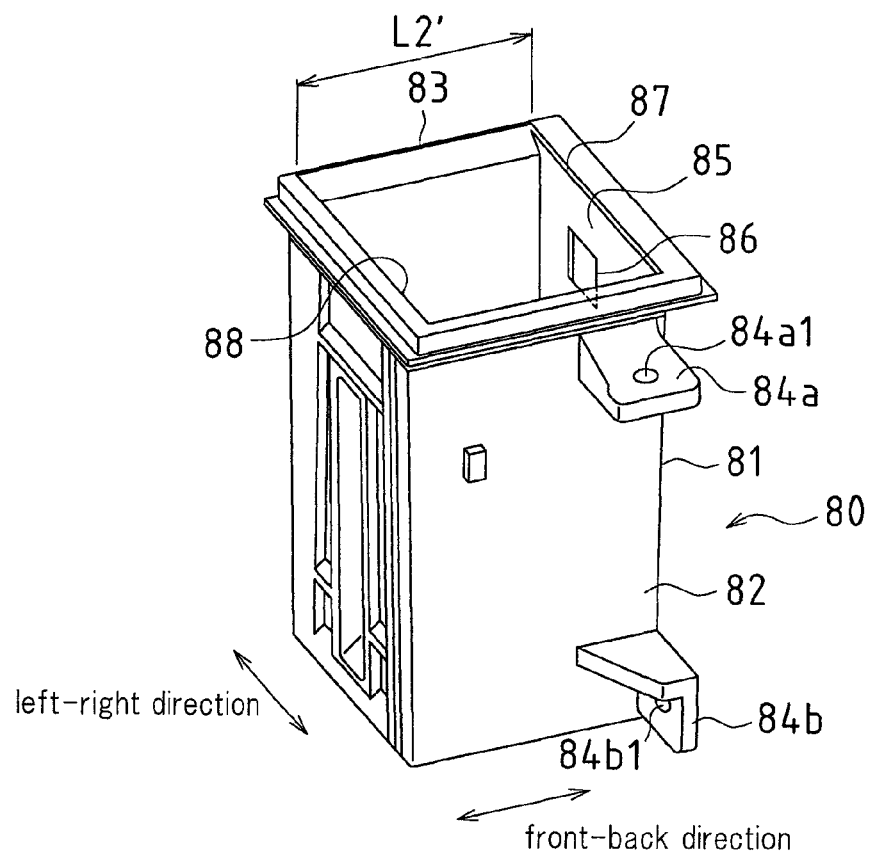
FIG. 5A is a perspective view of a hinge guide portion included in a cover attachment portion according to a specific example 2.
Figure 5B:
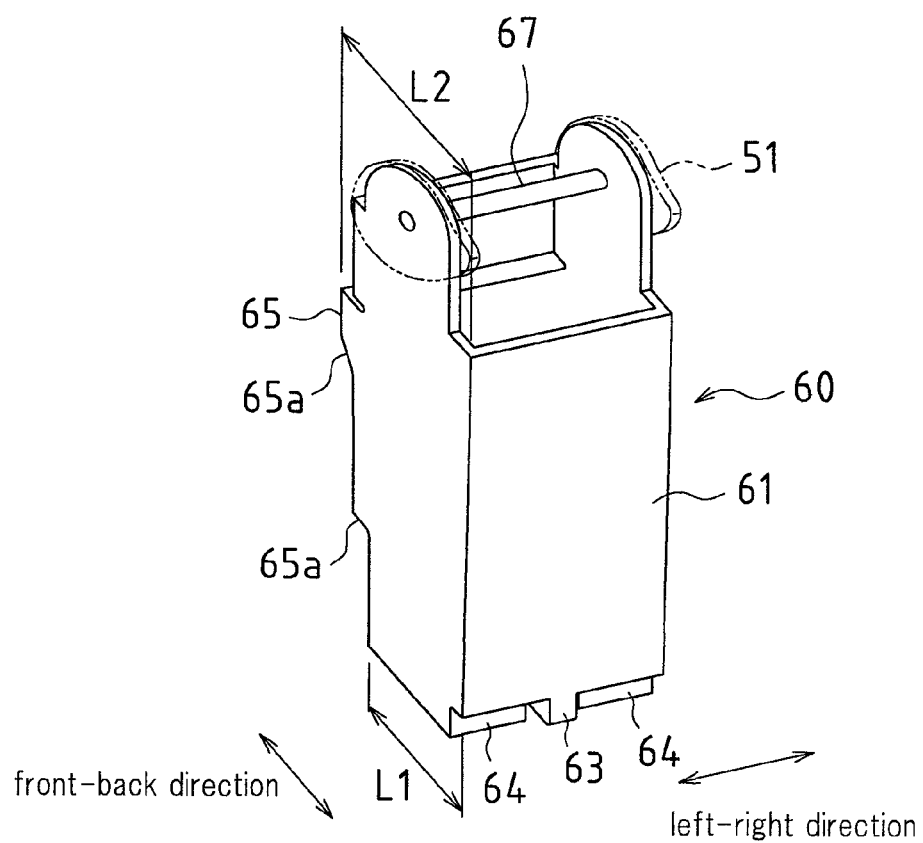
FIG. 5B is a perspective view of the rod-shaped hinge portion included in the cover attachment portion according to the specific example 2.

FIG. 2 to FIG. 4 are lateral views of the original reading portion 10, and show only portions of a cover attachment portion 50 as cross-sectional views. Furthermore, FIG. 5A is a perspective view of a hinge guide portion included in the cover attachment portion, and FIG. 5B is a perspective view of a rod-shaped hinge portion included in the cover attachment portion.

It should be noted that in the following description, the direction in which the original cover 10B opens and closes (the left-right direction in FIG. 2 to FIG. 4) as viewed by an operator facing a side surface on a far side from a hinge guide portion 80 in the image forming apparatus (an operator facing a side surface on a far side from the hinge guide portion 80 in the original reading portion 10) is referred to as a front-back direction, and the direction orthogonal to this (the direction perpendicular to the paper surface in FIG. 2 to FIG. 4) is referred to as a left-right direction. That is, in the following description, an orientation from a rotating shaft 52 (see FIG. 6A to FIG. 6D) of the original cover 10B in a direction extending vertical to the rotating shaft 52 of the original cover 10B and parallel to the original reading surfaces A and B of the platen glasses 11a and 11b is referred to as frontward, and a direction parallel to the rotating shaft 52 of the original cover 10B is referred to as the left-right direction.

A pair of cover attachment portions 50 are provided at end portions in the left-right direction in the rear portion of the original reading device main body 10A. However, in FIG. 2 to FIG. 4, only the near side cover attachment portion 50 is shown.

The cover attachment portion 50 is constituted by a rod-shaped hinge portion 60, which is attached to the original cover 10B through an open-close mechanism portion 51, and a hinge guide portion 80, which is provided in the original reading device main body 10A and through which the rod-shaped hinge portion 60 is inserted and supported.

The open-close mechanism portion 51 is provided to enable the original cover 10B to open in one direction (backward) to a first angle (approximately 60 degrees in the present embodiment) from a direction orthogonal to a longitudinal direction of the rod-shaped hinge portion 60 (that is, from the original placement surface of the original placement platform). That is, the open-close mechanism portion 51 is configured as a mechanical structure that enables the original cover 10B to open from a state (zero degree open angle state) shown in FIG. 2 placed on the original reading surfaces A and B of the platen glasses 11a and 11b, to a state shown in FIG. 3 in which it is open approximately 60 degrees, which is the first angle, from the original reading surfaces A and B of the platen glasses 11a and 11b.

The open-close mechanism portion 51 is secured to the original cover 10B. The open-close mechanism portion 51 is provided with the rotating shaft 52, and this rotating shaft 52 is rotatably supported in a shaft hole 67 of the rod-shaped hinge portion 60. In this way, the original cover 10B and the open-close mechanism portion 51 are configured so as to enable rotation of up to approximately 60 degrees (the first angle) centered on the rotating shaft 52, from the state shown in FIG. 2 in which the original cover 10B is in contact with the original reading surfaces A and B of the platen glasses 11a and 11b, to the state shown in FIG. 3 in which the original cover 10B is open approximately 60 degrees from the original reading surfaces A and B of the platen glasses 11a and 11b. The open-close mechanism portion 51 is also configured as a structure that enables the original cover 10B to rotate on the rotating shaft 52 and close, from the state shown in FIG. 3 to the state shown in FIG. 2, and accordingly the original cover 10B is capable of opening and closing. The open-close mechanism portion 51 is configured as a structure that inhibits the original cover 10B from opening from the original reading surfaces A and B of the platen glasses 11a and 11b by an angle greater than approximately 60 degrees, which is the first angle.

Although omitted from the drawings, in a state in which the original cover 10B is opened approximately 60 degrees, the open-close mechanism portion 51 is capable of maintaining the original cover 10B in that open state through an action of an elastic member or the like. Furthermore, the original cover 10B can be closed simply when the original cover 10B is pushed lightly downward from this state against the elastic force of the elastic member or the like. It should be noted that this mechanical structure is a widely known conventional structure and is not a principal component of the present invention and therefore detailed description is omitted here.

As shown in FIG. 5A, the hinge guide portion 80 overall is formed in a box shape of a substantially rectangular-parallelepiped form, and is formed by an open tube-shaped casing 81 whose upper portion is open (opening 87). At lateral outer wall surfaces 82 and 83 of the casing 81, attachment pieces 84a and 84b to the original reading device main body 10A are provided in a protruding manner near the opening 87 and at a lower portion of the casing 81 (note that only the near side attachment pieces are shown in FIG. 5A). And the attachment pieces 84a and 84b fit into rectangular openings (omitted from drawings) that are formed at a rear portion upper surface of the original reading device main body 10A to attach to an unshown frame of the original reading device main body 10A, and unshown male screws insert through screw holes 84a1 and 84b1 of the attachment pieces 84a and 84b into unshown female screw holes of the frame to threadedly engage with the screw holes 84a1 and 84b1 as well as the female screw holes, thereby securing the casing 81 to the rear portion upper surface of the original reading device main body 10A in the states shown in FIG. 2 to FIG. 4. In the hinge guide portion 80, which is secured to the original reading device main body 10A in this manner, a latch indentation 86 is formed at a central upper portion of a front side inner wall surface 85 of the casing 81. The indentation 86 may pass through to the outer wall surface, or may be formed so as to be indented from the front side inner wall surface 85 to the outer wall surface side to a specific depth.

On the other hand, as shown in FIG. 5B, the rod-shaped hinge portion 60 is overall formed in a rod shape of a substantially rectangular-parallelepiped form (or internally having a hollow rectangular tube shape), and a latch protrusion 63 is formed at the lower portion of a front side outer wall surface 61, that is, a lower end central portion, that is latched into the latch indentation 86 of the hinge guide portion 80. The latch protrusion 63 is formed by leaving a central portion in the left-right direction of the lower end portion of the front side outer wall surface 61 and cutting out the left and right sides thereof to the rear side substantially in an L shape. These cut-out portions 64 are configured as abutment avoiding cut-out portions that enable the lower end portions of the front side outer wall surface 61 of the rod-shaped hinge portion 60 to avoid abutting the front side inner wall surface 85 of the hinge guide portion 80 when the latch protrusion 63 is inserted and latched into the latch indentation 86.

Furthermore, the rod-shaped hinge portion 60 is formed so that a front-back direction dimension L1 of the lower portion is smaller than a front-back direction dimension L2 of the upper portion (L1<L2). That is, a rear side outer wall surface 65 of the rod-shaped hinge portion 60 is configured having level-difference shapes 65a in which midway portions are curved slightly from an upper portion to a lower portion. In specific example 1, the level-difference shapes 65a are provided in two locations in an up-down direction.

That is, while the transverse cross-section shape of the inner wall surface of the hinge guide portion 80 and the transverse cross-section shape of the outer wall surface of the upper portion of the rod-shaped hinge portion 60 are formed substantially equivalently so that the hinge guide portion 80 and the upper portion of the rod-shaped hinge portion 60 couple closely, the transverse cross-section shape of the outer surface wall of the lower portion of the rod-shaped hinge portion 60 (particularly the front-back direction dimension) is formed smaller than the transverse cross-section shape of the inner wall surface of the hinge guide portion 80 (particularly the front-back direction dimension) so that a gap P (see FIG. 6C described later) can be formed between the hinge guide portion 80 and the lower portion of the rod-shaped hinge portion 60 in the front-back direction.

That is, the front-back direction dimension of the hinge guide portion 80 is formed to a dimension in which the upper portion of the rod-shaped hinge portion 60 almost closely joins in a state capable of sliding up and down (that is, a dimension L2' that is slightly wider than the front-back direction dimension L2 of the rod-shaped hinge portion 60). It should be noted in regard to the left-right direction dimension of the hinge guide portion 80 and the rod-shaped hinge portion 60 that a dimensional relationship is configured in which the rod-shaped hinge portion 60 almost closely joins the hinge guide portion 80 in a state capable of sliding up and down (that is, a dimensional relationship in which there is almost no looseness in the left-right direction even when the rod-shaped hinge portion 60 is caused to slide up and down).

In this way, in a state during ordinary usage in which the rod-shaped hinge portion 60 is fully inserted into the bottom of the hinge guide portion 80, the upper portion of the rod-shaped hinge portion 60 is in a state closely coupled with the hinge guide portion 80 (L2 approximately equals L2'), and therefore there is no looseness when the original cover 10B is opened and closed, and the original cover 10B can be positioned with a predetermined positional accuracy. Furthermore, the rod-shaped hinge portion 60 does not come out unexpectedly from the hinge guide portion 80.

On the other hand, when the operator lifts up the original cover 10B in a state during ordinary usage, the rod-shaped hinge portion 60 is capable of moving a predetermined distance upward (a direction away from an extension surface of the original reading surfaces A and B of the platen glasses 11a and 11b). When the operator pulls the rod-shaped hinge portion 60 upward by a predetermined distance H (see FIG. 4) from the hinge guide portion 80, the upper portion of the rod-shaped hinge portion 60 comes out from the hinge guide portion 80, and only the lower portion of the rod-shaped hinge portion 60 is inserted inside the hinge guide portion 80. At this time, as described earlier, the front-back direction dimension L1 of the lower portion of the rod-shaped hinge portion 60 is formed smaller than the front-back direction dimension L2' of the hinge guide portion 80 (L2'>L1), and the gap P (see FIG. 6C) necessary for the rod-shaped hinge portion 60 to tilt backward by a second angle (for example, approximately 30 degrees), which is described later, is formed in the front-back direction between the hinge guide portion 80 and the rod-shaped hinge portion 60. In this way, after movement of the predetermined distance, the rod-shaped hinge portion 60 tilts up to the second angle in the rotation direction and its latch protrusion 63 can latch into the latch indentation 86 of the hinge guide portion 80. Accordingly, when the rod-shaped hinge portion 60 (that is, the original cover 10B) is tilted backward by the second angle from the guide direction of the hinge guide portion 80 (the direction vertical to the original reading surfaces A and B of the platen glasses 11a and 11b) in this state, the latch protrusion 63 of the rod-shaped hinge portion 60 is latched into the latch indentation 86 of the hinge guide portion 80, and the rear side outer wall surface 65 of the rod-shaped hinge portion 60 abuts an upper end corner portion 88a of a rear side inner wall surface 88 of the hinge guide portion 80 such that the rod-shaped hinge portion 60 is held stably in this state.

The cover attachment portion 50 according to specific example 1 is constructed in this manner.

Next, description is given of operations when opening the original cover 10B from a closed state to up to approximately 90 degrees with reference to operational transition drawings of the cover attachment portion 50 accompanying opening/closing operations of the original cover 10B shown in FIG. 2 to FIG. 4 and opening/closing operations of the original cover 10B shown in FIG. 6A to FIG. 6D. However, in FIG. 6A to FIG. 6D, although only the hinge guide portion 80 is shown in cross section, hatching to indicate the cross section is omitted.

When the operator (an ordinary user or a maintenance worker or the like) lifts up the front side of the original cover 10B (right side in FIG. 2) in the opening direction from the state shown in FIG. 2 and FIG. 6A in which the original cover 10B is closed to place an original or perform maintenance, the original cover 10B opens approximately 60 degrees as shown in FIG. 3 and FIG. 6B due to the operation of the open-close mechanism portion 51. This is the state during ordinary usage and, as shown in FIG. 6A and FIG. 6B, the rod-shaped hinge portion 60 is fully inserted into the bottom of the hinge guide portion 80 to be held by the hinge guide portion 80, and the upper portion of the rod-shaped hinge portion 60 closely couples with the hinge guide portion 80, and therefore there is no looseness in the original cover 10B when opening and closing the original cover 10B.

After this, in a case where an operator (maintenance worker or the like) desires to further open the original cover 10B to perform maintenance or the like, the original cover 10B is lifted upward by the predetermined distance H as shown in FIG. 6C. That is, the rod-shaped hinge portion 60 is pulled out upwardly from the hinge guide portion 80 by the predetermined distance H. In this way, the upper portion of the rod-shaped hinge portion 60 comes out from the hinge guide portion 80, and only the lower portion of the rod-shaped hinge portion 60 is inserted inside the hinge guide portion 80.

That is, the gap P is formed in the front-back direction between the hinge guide portion 80 and the rod-shaped hinge portion 60.

Accordingly, when the operator causes the rod-shaped hinge portion 60 to tilt to the backward side in this state (that is, when the operator causes the original cover 10B that is opened up to approximately 60 degrees to further tilt backward), the latch protrusion 63 of the rod-shaped hinge portion 60 is latched into the latch indentation 86 of the hinge guide portion 80 as shown in FIG. 4 and FIG. 6D, the rear side outer wall surface 65 of the rod-shaped hinge portion 60 abuts the upper end corner portion 88a of the rear side inner wall surface 88 of the hinge guide portion 80, and the rod-shaped hinge portion 60 is held in a state tilted backward by approximately 30 degrees from the guide direction of the hinge guide portion 80 (that is, the vertical direction that is orthogonal to the original reading surfaces A and B of the platen glasses 11a and 11b). That is, the original cover 10B opens (tilts) so that the angle of opening becomes larger by a further 30 degrees backward from the state opened up to approximately 60 degrees from the original reading surfaces A and B of the platen glasses 11a and 11b, and becomes held in a state opened to a direction (approximately vertical direction) that is substantially orthogonal to the original reading surfaces A and B of the platen glasses 11a and 11b.

Thus, in the present invention, factors for determining the extent of opening of the original cover 10B are divided into two operations of an opening/closing operation of a conventionally equivalent open-close mechanism portion, and a leaning operation of the rod-shaped hinge portion by pulling out the rod-shaped hinge portion 60 (that is, a latching/unlatching operation of the latch protrusion 63 of the rod-shaped hinge portion 60 and the latch indentation 86 of the hinge guide portion 80). Accordingly, during ordinary usage, the ordinary opening/closing operation of the original cover 10B is performed using the open-close mechanism portion 51. In a case where the operator desires to further open the original cover 10B to perform maintenance or the like, the original cover 10B can be further opened by the leaning operation of the rod-shaped hinge portion 60 by pulling out the rod-shaped hinge portion 60, thereby enlarging the space in the vicinity of the cover attachment portion 50. Accordingly, during maintenance or the like, operability can be improved particularly in the vicinity of the cover attachment portion 50. For example, the operator can easily insert a driver or the like for removing unshown securing screws in the vicinity of the cover attachment portion 50 that secure the platen glasses 11a and 11b without hindrance from the original cover 10B. In this way, there is no necessity to carry out repair work or the like by removing the original reading portion 10 from the image forming portion 30, and therefore workability is improved.

It should be noted that as is evident from FIG. 6A to FIG. 6D, in a case where the operator desires to completely remove the original cover 10B from the original reading device main body 10A, the original cover 10B may be lifted upward and the rod-shaped hinge portion 60 may be fully pulled out from the hinge guide portion 80.

SPECIFIC EXAMPLE 2

Figure 7:
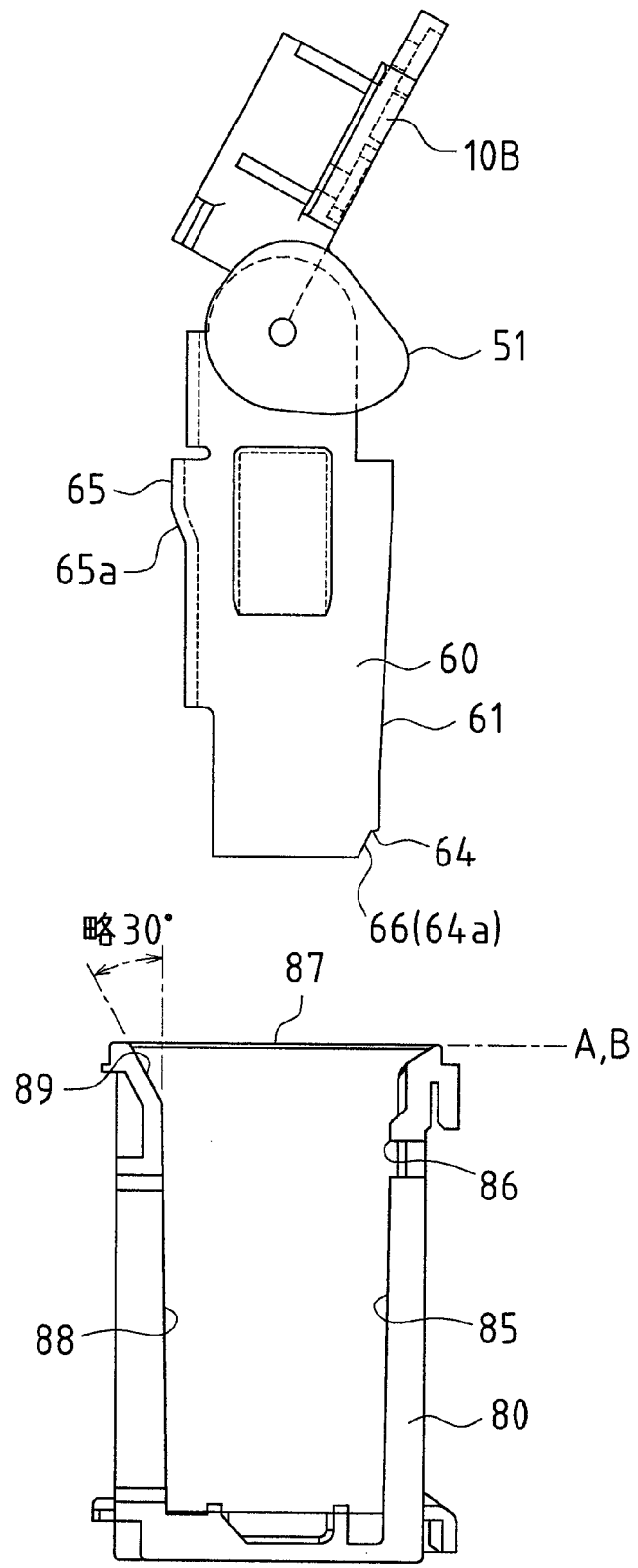
FIG. 7 is a cross-sectional view showing the specific example 2 of the cover attachment portion and shows a state in which the rod-shaped hinge portion and the hinge guide portion are disassembled.

FIG. 7 is a cross-sectional view showing a specific example 2 of the cover attachment portion 50, and shows a state in which the rod-shaped hinge portion 60 and the hinge guide portion 80 are disassembled. Note that hatching indicating cross section of the hinge guide portion 80 is omitted in FIG. 7.

Although the fundamental configuration is entirely the same as the specific example 1, in the specific example 2, a structure is achieved that gives further consideration to stability when the original cover 10B is opened up to approximately 90 degrees.

That is, with the cover attachment portion 50 according to specific example 2, an upper portion of the rear side inner wall surface 88 of the hinge guide portion 80 is formed to a first tilted surface 89 that tilts backward by approximately 30 degrees, which is the second angle, from a direction vertical to the original reading surfaces A and B of the platen glasses 11a and 11b (that is, the guide direction of the hinge guide portion 80). Furthermore, a trailing surface 64a of the cut-out portions 64 formed at the lower end portion of the front side outer wall surface 61 of the rod-shaped hinge portion 60 is extended further downward, and the trailing surface 64a is formed as a second tilted surface 66, which is tilted backward by approximately 30 degrees, which is the second angle, from the wall surface of the upper portion of the front side outer wall surface 61 (that is, from the direction vertical to the original reading surfaces A and B of the platen glasses 11a and 11b).

With this configuration, when the operator tilts the rod-shaped hinge portion 60 backward up to the second angle (approximately 30 degrees) from the hinge guide portion 80 in a state in which the rod-shaped hinge portion 60 is pulled upward from the hinge guide portion 80 by the predetermined distance H, the latch protrusion 63 of the rod-shaped hinge portion 60 is latched into the latch indentation 86 of the hinge guide portion 80, the rear side outer wall surface 65 of the rod-shaped hinge portion 60 makes surface contact with the first tilted surface 89 of the hinge guide portion 80 and is held by the first tilted surface 89 of the hinge guide portion 80, and the second tilted surface 66 of the rod-shaped hinge portion 60 makes surface contact with the front side inner wall surface 85 of the hinge guide portion 80 and is held by the front side inner wall surface 85 of the hinge guide portion 80.

Next, description is given of operations when opening the original cover 10B from a closed state to up to approximately 90 degrees with reference to operational transition drawings of the cover attachment portion 50 accompanying opening/closing operations of the original cover 10B shown in FIG. 2 to FIG. 4 and opening/closing operations of the original cover 10B shown in FIG. 8A to FIG. 8D. However, in FIG. 8A to 8D, although only the hinge guide portion 80 is shown in cross section, hatching to indicate the cross section is omitted.

When the operator lifts up the original cover 10B in the opening direction from the state shown in FIG. 2 and FIG. 8A in which the original cover 10B is closed, the original cover 10B opens approximately 60 degrees as shown in FIG. 3 and FIG. 8B due to the operation of the open-close mechanism portion 51. This is the state during ordinary usage and, as shown in FIG. 8A and FIG. 8B, the rod-shaped hinge portion 60 is fully inserted into the bottom of the hinge guide portion 80 to be held by the hinge guide portion 80, and the upper portion of the rod-shaped hinge portion 60 closely couples with the hinge guide portion 80, and therefore there is no looseness when opening and closing the original cover 10B.

After this, in a case where the operator desires to further open the original cover 10B to perform maintenance or the like, the original cover 10B is lifted upward by the predetermined distance H as shown in FIG. 8C. That is, the operator upwardly pulls up the rod-shaped hinge portion 60 from the hinge guide portion 80 by the predetermined distance H. In this way, the upper portion of the rod-shaped hinge portion 60 comes out from the hinge guide portion 80, and only the lower portion of the rod-shaped hinge portion 60 is inserted inside the hinge guide portion 80. That is, the gap P is formed in the front-back direction between the hinge guide portion 80 and the rod-shaped hinge portion 60.

Accordingly, in this state, when the operator tilts the rod-shaped hinge portion 60 backward (that is, further tilts backward the original cover 10B that is open up to approximately 60 degrees), as shown in FIG. 4 and FIG. 8D, the latch protrusion 63 of the rod-shaped hinge portion 60 is latched into the latch indentation 86 of the hinge guide portion 80, the rear side outer wall surface 65 in the lower portion of the rod-shaped hinge portion 60 makes surface contact with the first tilted surface 89 of the hinge guide portion 80 and is held by the first tilted surface 89 of the hinge guide portion 80, and the second tilted surface 66 of the rod-shaped hinge portion 60 makes surface contact with the front side inner wall surface 85 of the hinge guide portion 80 and is held by the front side inner wall surface 85 of the hinge guide portion 80. That is, the rod-shaped hinge portion 60 can be held by making surface contact with the inner wall surface of the hinge guide portion 80 at two locations, these being the upper portion of the rear side outer wall surface and the lower portion of the front side outer wall surface, and therefore the rod-shaped hinge portion 60 can be more stably held in a state tilted backward by approximately 30 degrees from the guide direction of the hinge guide portion 80 (that is, the vertical direction orthogonal to the original reading surfaces A and B of the platen glasses 11a and 11b). Accordingly, even in a case where the original cover 10B in a state opened up to the first angle (approximately 60 degrees) is further tilted backward up to the second angle (approximately 30 degrees) by pulling out the rod-shaped hinge portion 60 by the predetermined distance H (that is, in a case where the original cover 10B is in a state opened up to approximately 90 degrees from the original reading surfaces A and B of the platen glasses 11a and 11b), the original cover 10B can be held more stably in that state.

It should be noted that in the specific example 2, the first tilted surface 89 is formed in the upper portion of the rear side inner wall surface 88 of the hinge guide portion 80 and the second tilted surface 66 is formed in the lower portion of the front side outer wall surface 61 of the rod-shaped hinge portion 60, but it is possible for only one of these tilted surface formations to be used, and even in this case it is possible for the original cover 10B to be held sufficiently stably in a state opened approximately 90 degrees.

The present invention can be embodied and practiced in other different forms without departing from the spirit and essential characteristics thereof. Therefore, the above-described working examples are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. An original reading device comprising an original cover that is provided with an original transport device; an original reading device main body that is provided with an original placement platform; and a cover attachment portion that attaches the original cover to the original reading device main body in an openable and closeable manner,
    wherein the cover attachment portion comprises a rod-shaped hinge portion that is attached to the original cover through an open-close mechanism portion; and a hinge guide portion that is provided in the original reading device main body and through which the rod-shaped hinge portion is inserted and supported, and
    a latch indentation is provided in the hinge guide portion such that a latch protrusion provided at a lower portion of the rod-shaped hinge portion is latched into the latch indentation in a state in which the rod-shaped hinge portion is pulled out a predetermined distance from the hinge guide portion.

2. The original reading device according to claim 1,
    wherein the open-close mechanism portion is arranged to enable the original cover to open in one direction up to a first angle from a direction orthogonal to a longitudinal direction of the rod-shaped hinge portion, and
    in a state in which the latch protrusion is latched into the latch indentation, the rod-shaped hinge portion is held tilted in the one direction up to a second angle from a guide direction of the hinge guide portion.

3. The original reading device according to claim 2,
    wherein the first angle is set to approximately 60 degrees and the second angle is set to approximately 30 degrees.

4. The original reading device according to claim 2,
    wherein when a direction in which the original cover opens is a front-back direction as viewed by an operator facing a side surface on a far side from the hinge guide portion in the original reading device main body,
    the cover attachment portion is arranged in a rear portion of the original reading device main body,
    the rod-shaped hinge portion is formed in a rod shape, and
    the hinge guide portion is formed as an open tube, and an upper portion of a rear side inner wall surface of the hinge guide portion is formed as a first tilted surface that is tilted backward from a direction vertical to an original reading surface of the original placement platform by the second angle.

5. The original reading device according to claim 4,
    wherein the rod-shaped hinge portion has the latch protrusion formed at a lower portion of a front side outer wall surface, and a lower part below the latch protrusion of the front side outer wall surface is formed as a second tilted surface that is tilted backward by the second angle from an upper part above the latch protrusion of the front side outer wall surface.

6. The original reading device according to claim 5,
    wherein the rod-shaped hinge portion is formed so that a front-back direction dimension of a lower portion is smaller than a front-back direction dimension of an upper portion.

7. The original reading device according to claim 6,
    wherein the rod-shaped hinge portion is formed as a rod shape having a substantially rectangular-parallelepiped form, and
    the hinge guide portion is formed as an open tube having a substantially rectangular-parallelepiped form.

8. The original reading device according to claim 5,
    wherein the rod-shaped hinge portion is formed as a rod shape having a substantially rectangular-parallelepiped form, and
    the hinge guide portion is formed as an open tube having a substantially rectangular-parallelepiped form.

9. The original reading device according to claim 4,
    wherein the rod-shaped hinge portion is formed so that a front-back direction dimension of a lower portion is smaller than a front-back direction dimension of an upper portion.

10. The original reading device according to claim 9,
wherein the rod-shaped hinge portion is formed as a rod shape having a substantially rectangular-parallelepiped form, and
the hinge guide portion is formed as an open tube having a substantially rectangular-parallelepiped form.

11. The original reading device according to claim 4,
wherein the rod-shaped hinge portion is formed as a rod shape having a substantially rectangular-parallelepiped form, and
the hinge guide portion is formed as an open tube having a substantially rectangular-parallelepiped form.

12. The original reading device according to claim 2,
wherein when a direction in which the original cover opens is the front-back direction as viewed by an operator facing a side surface on a far side from the hinge guide portion in the original reading device main body,
the rod-shaped hinge portion has the latch protrusion formed at a lower portion of a front sideouter wall surface, and a lower part below the latch protrusion of the front side outer wall surface is formed as a second tilted surface that is tilted backward by the second angle from an upper part above the latch protrusion of the front side outer wall surface.

13. The original reading device according to claim 1,
wherein the open-close mechanism portion is arranged to enable the original cover to rotate in a rotation direction up to a first angle centered on a rotating shaft, and
the rod-shaped hinge portion is held in the hinge guide portion so as to enable the rod-shaped hinge portion to move the predetermined distance in a direction away from an extension surface of the original placement surface of the original placement platform, and further still to tilt in the rotation direction up to a second angle such that the latch protrusion is latched into the latch indentation.

14. The original reading device according to claim 1,
wherein when a direction in which the original cover opens is a front-back direction as viewed by an operator facing a side surface on a far side from the hinge guide portion in the original reading device main body,
the rod-shaped hinge portion is formed so that a front-back direction dimension of a lower portion is smaller than a front-back direction dimension of an upper portion.

15. An image forming apparatus comprising an original reading device according to claim 1 and an image forming portion.

* * * * *